R. L. GREER.
AUXILIARY WINDSHIELD.
APPLICATION FILED JUNE 5, 1919.

1,382,284.

Patented June 21, 1921.

INVENTOR.
Robert L. Greer.
BY A. B. Bowman
ATTORNEY

UNITED STATES PATENT OFFICE.

ROBERT L. GREER, OF SAN DIEGO, CALIFORNIA.

AUXILIARY WINDSHIELD.

1,382,284.

Specification of Letters Patent. Patented June 21, 1921.

Application filed June 5, 1919. Serial No. 302,034.

*To all whom it may concern:*

Be it known that I, ROBERT L. GREER, a citizen of the United States, residing at San Diego, in the county of San Diego and State of California, have invented certain new and useful Auxiliary Windshields, of which the following is a specification.

My invention relates to auxiliary wind shields which are mounted adjacent the ends of the conventional automobile wind shields and extend outwardly and backwardly on an angle to prevent the side wind from striking the occupants of the front seat and the objects of my invention are: First, to provide an auxiliary wind shield of this class which is adjustable throughout and in which the transparent shield may be moved to various angles relatively to the main wind shield; second, to provide new and novel clamping means for securing the auxiliary wind shield to the post of the conventional wind shield; third, to provide such a means that is resilient for protecting the glass against breaking through variations of expansion of the glass relatively to the supporting means and fourth, to provide an auxiliary wind shield of this class which is very simple and economical of construction, durable, easy to install in position, easy to adjust and which is readily applicable to the different makes of vehicles now in use and which will not readily deteriorate or get out of order.

Figure 1:
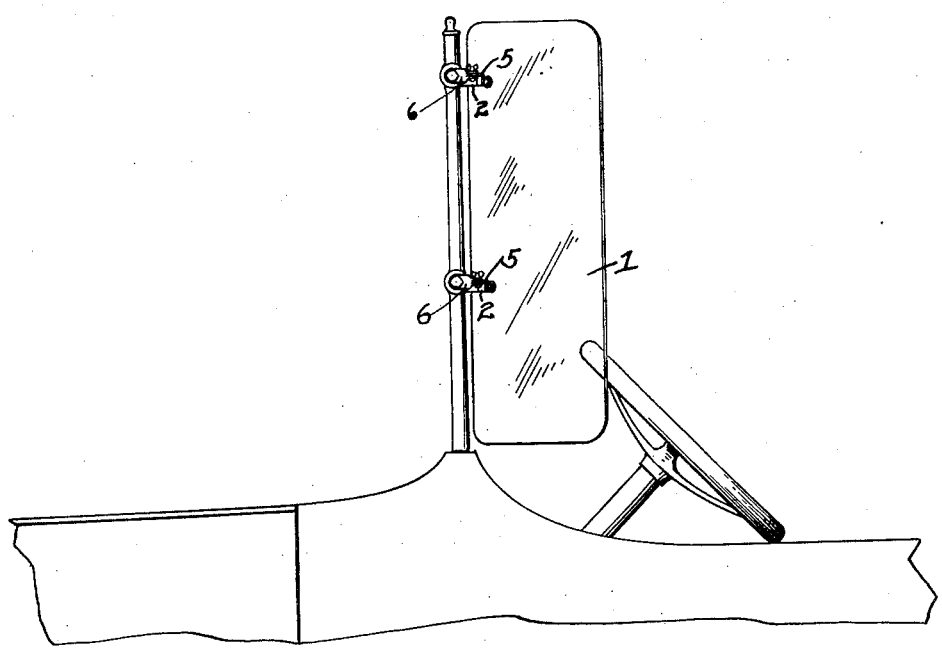
Figure 2:
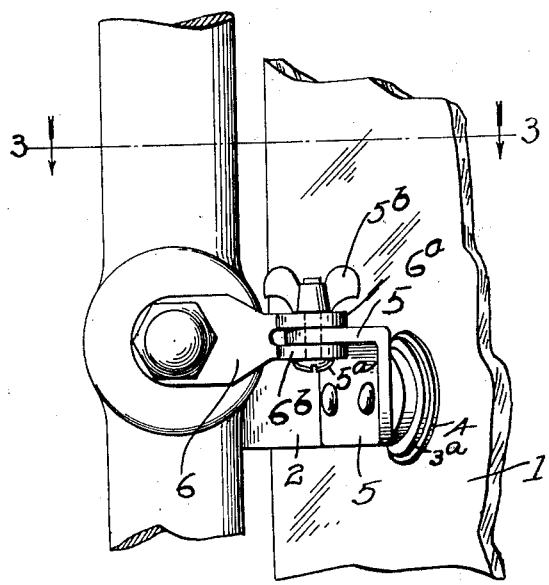
Figure 3:
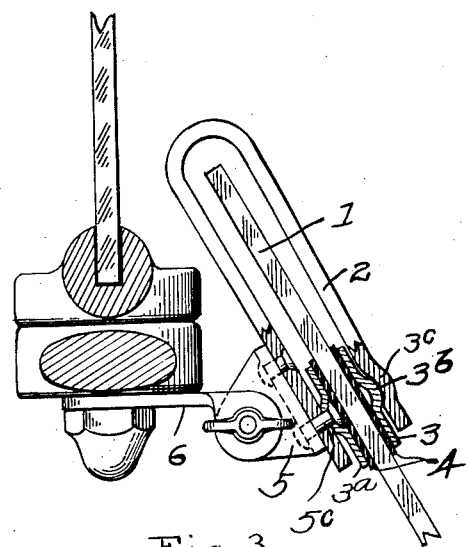

With these and other objects in view as will appear hereinafter my invention consists of certain novel features of construction, combination and arrangement of parts and portions as will be hereinafter described in detail and particularly set forth in the appended claims reference being had to the accompanying drawings and to the characters of reference thereon which form a part of this application, in which:

Figure 1 is a side elevational view of a fragmentary portion of a vehicle body showing my auxiliary wind shield in operative position on the conventional wind shield post; Fig. 2 is an enlarged detailed side elevational view of one of my devices for supporting the wind shield showing the wind shield and supporting post fragmentarily on an enlarged scale and Fig. 3 is a sectional view through 3—3 of Fig. 2.

Similar characters of reference refer to similar parts and portions throughout the several views of the drawings.

The auxiliary shield member 1, clip member 2, washers 3 and 3ª, cushion supports 4, arm 5 and clamp support 6 constitute the principal parts and portions of my auxiliary wind shield.

The shield member 1 is preferably a rectangular shaped transparent member with rounded corners preferably composed of glass. Mounted over its edge is a U shaped resilient clip 2, the extended ends of which are adapted to engage the glass with sufficient pressure to support the same by frictional contact by reason of the inherent spring of the metal. This clip is provided with a bulged portion 3ᶜ adapted for the bulged portion 3ᵇ of the washer 3 and secured to opposite sides of said clip 2 is another washer 3ª by means of rivet 5ᶜ and secured to the inner surfaces of these washers 3 and 3ª are resilient washers 4 composed of either rubber or felt. The extended ends of this member 2 together with the washers are sprung over the edge of the glass and supports the same by reason of the inherent spring of the metal of the clip 2. Secured to the side of the clip 2 is an arm member 5 which is an L shaped member and provided with a hole in its extended end adapted for the bolt 5ª. This member 5 is supported by means of a bifurcated clamp member 6 with a hole in the double portion thereof conforming to the hole in the member 5 and mounted in these holes is a bolt 5ª provided with a wing nut 5ᵇ for clamping these members 5 and portions 6ª and 6ᵇ together in certain relative positions and holding them in such positions by reason of the frictional contact of said member. This member 6 is supported on the conventional wind shield support by means of the conventional pivot bolt in said support. It will be noted that it is preferred to use two of these devices for supporting the shield as shown in Fig. 1.

Though I have shown and described a particular construction, combination and arrangement of parts and portions I do not wish to be limited to this particular construction, combination and arrangement but desire to include in the purview of my invention the construction, combination and arrangement substantially as set forth in the appended claims.

It is obvious that with this construction there is provided a means for adjustably securing an auxiliary wind shield to the supports of the conventional wind shield which provides for adjusting said auxiliary wind shield to various angles relatively to the conventional shield. That the auxiliary shield is supported by a resilient clip which takes care of the expansion and contraction of the glass and provides an adjustable device for supporting the shield.

Having thus described my invention what I claim as new and desire to secure by Letters Patent, is:

1. An auxiliary wind shield for vehicles, including a transparent wind shield member, a pair of resilient clips sprung over the edge of said transparent shield member in spaced relation with their extended ends adapted to engage the opposite sides of said transparent shield member and an arm member secured to the side of each of said spring clips and a clamp support pivotally connected to each of said arm members at their one ends and secured to the conventional bolts on the conventional wind shield at their other ends.

2. An auxiliary wind shield for vehicles, including a transparent wind shield member, a pair of resilient spring clips, sprung over the edge of said transparent shield member with their extended ends provided with offset portions, resilient members secured between the extended ends of said spring clips and adapted to engage the opposite sides of said wind shield member, an arm member secured to each of said resilient spring clips and a clamp support pivotally and frictionally connected to said arm member.

3. An auxiliary wind shield for vehicles, including arm members secured to the conventional bolts on the conventional vehicle wind shield and extending in spaced relation to each other, spring clips pivotally and frictionally connected to the extended ends of said arm members, resilient cushion members positioned between the extended ends of said spring clips and a plate with its side edge positioned between the members of said spring clips and supported by the inherent spring of the metal in said spring clips.

In testimony whereof, I have hereunto set my hand at San Diego, California, this 29th day of May, 1919.

ROBERT L. GREER.